3,259,671
PROCESS FOR PREPARING ORGANIC PHOSPHINIC ACIDS AND ESTERS FROM OLEFINS AND PRODUCTS PRODUCED THEREBY
Eric Jungermann, La Grange, Ill., and Raymond J. Clutter, Colonial Heights, Va., assignors to Armour and Company, Chicago, Ill., a corporation of Delaware
No Drawing. Filed July 13, 1962, Ser. No. 209,768
8 Claims. (Cl. 260—961)

This application is a continuation-in-part of our copending application Serial No. 753,136, now abandoned, filed August 4, 1958, and entitled "Organo-Phosphorus Compounds and Preparation."

This invention is concerned with certain organic phosphinic acids and their corresponding esters, including the preparation of these organo-phosphorus compounds.

The primary object of the present invention is to provide a novel class of organic phosphinic acids and the esters thereof. The invention also has as its objective the provision of a novel process for producing these organo-phosphorus compounds. Further objects and advantages will be indicated in the following detailed specification.

In practicing the present invention, the starting material is an aliphatic compound containing from 2 to 30 carbon atoms, and characterized by containing an olefinic bond. For best results, the aliphatic compound should be free of chloride or other halide groups. One preferred subclass of aliphatic compounds are those containing from 4 to 22 carbon atoms, and providing a single olefinic bond in a non-terminal position. Specific examples of such compounds are isobutylene, oleic acid, and 2,4,4-trimethyl pentene-2.

According to the present invention, the aliphatic compound providing the olefinic bond is reacted with a phosphorus chloride compound such as phosphorus trichloride or phenyl phosphorus dichloride. More generally, the phosphorus chloride compound may be represented by the type formula:

$$R\!-\!PCl_2$$

wherein R is selected from the class consisting of a chloride group and an aryl hydrocarbon group. For example, R can be a phenyl or naphthyl. Analogous phosphorus bromide compounds, such as phosphorus tribromide, can also be used with some success.

To achieve the novel reaction of the present invention, it is essential that the phosphorus chloride compound be in intimate association with a Friedel-Crafts catalyst such as aluminum chloride. The Friedel-Crafts catalyst plays an important role in the reaction. Apparently, it first complexes with the phosphorus chloride compound, although this has not been established with certainty. It is known, however, that best results are obtained when the phosphorus chloride compound and the Friedel-Crafts catalyst are employed in equi-molar proportions, and optimum yields are obtained when at least one mole each of the phosphorus chloride compound and the Friedel-Crafts catalyst are present per mole of the olefinic bond. To assure complete conversion of the olefinic bonds, a molar excess of the Friedel-Crafts catalyst and the phosphorus chloride compound can be utilized. As a matter of reagent economy, however, a large excess should be avoided. Speaking generally, the reaction mixture can contain from 1 to 5 moles of the phosphorus chloride compound and from 1 to 5 moles of the Friedel-Crafts catalyst per mole of aliphatic compound providing a single olefinic bond.

When a functional group which complexes with the Friedel-Crafts catalyst is also present, such as the carboxylate group of methyl oleate, an additional mole of the Friedel-Crafts catalyst should be used. For example, in using methyl oleate as the starting material, it would be preferred to use at least 2 moles of aluminum chloride together with at least 1 mole of phosphorus trichloride.

Aluminum chloride is the preferred example of a Friedel-Crafts catalysts for use in the process of the present invention. However, other metallic halides, having similar properties in respect to their action as a Friedel-Crafts catalyst can be used. The following are illustrative: ferric chloride, aluminum bromide, boron fluoride, zinc chloride, etc.

For best results, it is preferred to carry out the reaction in an organic solvent medium. The solvent should be inert under the conditions of the reaction, and is preferably a mutual solvent for the reactants. Excellent results have been obtained by using methylene chloride as the solvent, but other solvents of similar properties can be used. For example, solvents such as ethylene dichloride or perchloroethylene. Aromatic solvents such as nitrobenzene can also be used.

In order to maintain the solvent and the reactants in the liquid phase, it is preferred to carry out the reaction at a temperature below the boiling point of the most volatile constituent. Usually a temperature below 50° C. will be suitable, but in some cases temperatures up to 75° C. can be used. Temperatures down to as low as −15° C. can be used. Usually, the temperature at the start of the reaction should be lower than when the reaction is completed. For example, the reaction can be started at a temperature of around 0 to 5° C., and the temperature allowed to gradually rise until the reaction is completed at a temperature of around 25 to 35° C.

The intermediate reaction product produced as described above is a phosphinic acid chloride. It can be readily converted to the corresponding phosphinic acid or phosphinic acid ester. The phosphinic acid can be readily formed from the intermediate product by a single hydrolysis procedure. Either the phosphinic acid or the intermediate phosphinic acid chloride can be esterified according to well-known esterification procedures.

The intermediate product can be decomposed or hydrolyzed to the corresponding phosphinic acid in an aqueous medium, such as water or aqueous methanol. Upon mild hydrolysis a mixture of the acid chloride and the acid will be formed, and upon continued hydrolysis, or by using more severe conditions, the acid chloride can be completely converted to the phosphinic acid.

Where the corresponding ester is desired, all that is required is to esterify either the phosphinic acid chloride or the phosphinic acid. For example the alkoxide (sodium alcoholate), such as sodium ethoxide, can be reacted with the acid chloride according to well-known esterification procedures. The sodium chloride by-product can be filtered off, and the solvent stripped to yield the phosphinic acid ester. If it is desired to prepare the ester from the phosphinic acid, the method described in copending application Serial No. 104,261, filed April 20, 1961, now U.S. Patent 3,110,600, can be used. In the process of that application, the phosphinic acid is heated with the alcohol in the presence of an esterification catalyst, such as calcium oxide, zinc metal dust, dibutyl tin oxide, p-toluene sulfonic acid, β-naphthol sulfonic acid, etc. A reaction temperature of at least 160° C. is desirable.

The alcohol used for the esterification, or for formation of the alkoxide, can be an aromatic or aliphatic alcohol, but the aliphatic alcohols are preferred. For example, aliphatic alcohols containing from 1 to 18 carbon atoms can be used. The short chain alcohols containing from 1 to 8 carbon atoms are preferred.

The present invention is further illustrated by the following specific examples.

Example I

Into a flask were placed 100 ml. of methylene chloride, 29.5 g. (0.2 mole) of $PCl_3$ and 32.4 g. (0.2 mole) of $FeCl_3$. Methyl oleate (28.3 g. or 0.1 mole), dissolved in 50 ml. of methylene chloride was added with stirring at room temperature. The temperature gradually rose from 25–35° C. After the addition, the mixture was stirred for an additional hour at room temperature. Two hundred ml. of methanol was added and the stirring continued for two more hours at room temperature. The methylene chloride solution was then washed until neutral, dried over anhydrous sodium sulfate and the solvent stripped under vacuum. Yield—31 g. of thin liquid. This product was a mixture of the phosphinic acid and the acid chloride.

Example II

Into a 250 ml. round bottom flask, 25.2 g. (0.2 mole) of nonene (a commercial propylene trimer) were added dropwise to a mixture of 55.0 g. (0.4 mole) of $PCl_3$, 53.3 g. (0.4 mole) of $AlCl_3$, and 240 ml. of $CH_2Cl_2$ at 0° C. The mixture was then reacted at room temperature for one and a half hours. An excess (320 ml.) of $CH_3OH$ was added cautiously to the phosphorylated nonene. A large amount of HCl gas was evolved. The mixture was allowed to stir for two hours at room temperature. Excess water was added with stirring keeping the temperature below 25° C. The methylene chloride layer was separated from the aqueous layer, washed until neutral, and dried over anhydrous sodium sulfate. The solvent was then stripped under vacuum leaving 39.8 g .of a thin, light yellow liquid. This product was a mixture of the phosphinic acid and chloride. *Analysis.*—Calcd. for $C_9H_{18}POCl$: P, 14.9; Cl, 17.0. Found: P, 13.9; Cl, 15.3.

Example III

Into a 250 ml. round bottom flask, 24.2 g. (.075 mole) of 11-tricosene were added dropwise to a mixture of 20.6 g. (.15 mole) of $PCl_3$, 20 g. (.15 mole) of $AlCl_3$ and 92.5 ml. of $CH_2Cl_2$ at 0° C. The mixture was then reacted at room temperature for one and a half hours. An excess (125 ml) of $CH_3OH$ was added cautiously to the phosphorylated 11-tricosene. A large amount of HCl gas was evolved. The mixture was allowed to stir for two hours at room temperature. Excess water was added with stirring keeping the temperature below 25° C. The methylene chloride layer was separated from the aqueous layer, washed until neutral, and dried over anhydrous sodium sulfate. The solvent was then stripped under vacuum leaving 32.7 g. of a pale yellow oil. This product was a mixture of the phosphinic acid and the phosphinic acid chloride. Calcd. for $C_{23}H_{46}POCl$: P, 7.65; Cl, 8.77; iodine value, 0.0. Found: P, 7.8; Cl, 4.9; iodine value, 9.0.

Example IV

Into a 250 ml. round bottom flask, 134.7 g. (.8 mole) of tetrapropylene were added dropwise to a mixture of 213.2 g. (1.6 moles) of $AlCl_3$, 220 g. (1.6 moles) of $PCl_3$ and 650 ml. of $CH_2Cl_2$ at 0° C. The mixture was then reacted at room temperature for one and a half hours. An excess (1000 ml.) of $CH_3OH$ was added cautiously to the phosphorylated tetrapropylene. A large amount of HCl gas was evolved. The mixture was allowed to stir for two hours at room temperature. Excess water was added with stirring keeping the temperature below 25° C. The methylene chloride layer was separated from the aqueous layer, washed until neutral, and dried over anhydrous sodium sulfate. The solvent was then stripped under vacuum leaving 185 g. of a light yellow oil. This product was the phosphinic acid chloride, which did not appreciably hydrolyze to the acid because of the steric hindrance.

Example V

Nonene (12.6 g. or 0.1 mole) was dissolved in 50 ml. of dry methylene chloride. This solution was then added dropwise to a vigorously stirred mixture of 26.6 g. (0.2 mole) of anhydrous aluminum chloride, 17.9 g. (0.1 mole) of benzene phosphorus dichloride and 100 ml. of methylene chloride. The addition of nonene required about 20 minutes. During this time the temperature rose from 28 to 40°. The mixture was then reacted at room temperature for 2½ hours. One hundred fifty milliliters of anhydrous methanol was then added slowly. The reaction was continued at room temperature for 2½ more hours. Water was added with cooling. The water layer was extracted twice with methylene chloride. The methylene chloride fractions were combined and washed till neutral dried over $Na_2SO_4$ and stripped in vacuo. The product was a viscous oil composed of a mixture of the phosphinic acid and the phosphinic acid chloride. *Analysis.*—Calcd. for, $C_{15}H_{23}OP$: P, 12.4; Cl, 0; I.V., 0. Found: P, 10.45; Cl, 3.68; I.V., 31.5.

Example VI

The reaction was run in a round bottom flask with a stirrer, thermometer, dropping funnel, and a reflux condenser with a drying tube. To the reaction flask was added 160 ml. dry methylene chloride 55 g. (0.4 mole) phosphorus trichloride, and 53.3 g. (0.4 mole) of aluminum chloride. The mixture was cooled to 0° C. and 50.4 g. (0.2 mole) of a branched octadecene in 160 ml. methylene chloride was added with agitation over a 45 minute period. During the addition, the temperature was kept at 0° C. After the addition was completed, the stirring was continued at room temperature for one and a half hours. Anhydrous methanol (320 ml.) was then added over a half hour period with the temperature kept at 15–20° C. by cooling. The reaction mixture was then stirred for two hours at room temperature. Excess water was carefully added with stirring, the organic layer was separated, washed with water, and the methylene chloride was distilled off. The residual oil was then boiled with 250 ml. of 2 N aqueous NaOH for three hours, the mixture was cooled, acidified cautiously with hydrochloric acid, and extracted with ether. The extract was washed with water until neutral, dried over anhydrous sodium sulfate, and the ether removed in vacuo. The residue was an extremely viscous, yellow oil composed of the phosphinic acid.

Acid equivalent weight: Calcd. 334 or 2.99 meq./g. Found: 395 or 2.53 meq./g.

Example VII

Commercial nonene (25.2 g., 0.2 mole) in 80 ml. methylene chloride was reacted with 55 g. (0.4 mole) of phosphorus trichloride in 160 ml. of methylene chloride and 53.3 g. (0.4 mole) aluminum chloride, in the same manner as described in Example VI. After decomposition with 320 ml. anhydrous methanol and addition of excess water, the organic layer was separated, worked up and treated with 50 g. (0.42 mole) of thionyl chloride. The residue remaining after removal of excess thionyl chloride was added to 350 ml. of anhydrous 2-methylhexanol in which 5 g. (0.22 mole) of sodium has been dissolved. The mixture was boiled under reflux for 24 hours, cooled, filtered, and the filtrate added with vigorous agitation to an excess of ice-water. The oil layer was then separated, washed with water until neutral, and the excess 2-ethylhexanol was removed by vacuum distillation. The residual ester was a clear, almost water-white, neutral oil.

Example VIII

To a 250 ml. round bottom flask were added 50 ml. of methylene chloride followed by 17.13 g. (0.125 mole) of $PCl_3$ and 16 g. (0.125 mole) of powdered anhydrous $AlCl_3$. This solution was cooled to 0° C. A mixture of 18.53 g. (0.0625 mole) of methyl oleate and 25 ml. of methylene chloride was then added slowly over a 45 minute period. During the addition the mixture was stirred vigorously and the temperature was kept between 0° C. and 5° C. The solution was then refluxed for two hours.

Twenty-eight grams of anhydrous methanol were slowly added to the reaction product formed during the phosphorylation. The mixture was then stirred. This was followed by decomposition with water, extraction with ethyl ether, washing until neutral and then drying over $Na_2SO_4$. The solvent was removed under vacuum leaving 20.5 g. of a pale yellow oil principally composed of a mixture of the phosphinic acid and the acid chloride.

*Example IX*

The phosphinic acid chloride from a $C_{15}$ olefin prepared as described in the foregoing examples was heated with excess 2-ethylhexyl alcohol in the presence of 0.3 mole percent CaO at 195–206° C. for 72 hours. A 68% yield of the 2-ethylhexyl ester was obtained.

*Example X*

The phosphinic acid from a $C_9$ olefin prepared as described in the foregoing examples was heated with an excess 2-ethylhexyl alcohol and 2.6 mole percent CaO at 193–211° C. for 40 hours. An 87% yield of ester was obtained.

*EMample XI*

A solution of 2,4,4-trimethylpentene-2 (33.7 g., 0.3 m.) in 100 ml. of methylene chloride was added dropwise to a mixture of anhydrous aluminum chloride (53.3 g., 0.4 m.) and phosphorus trichloride (55 g., 0.4 m.) in 200 ml. of methylene chloride at 0°. The addition required 45 minutes. After 30 minutes, 320 ml. of methanol was added, allowing the reaction mixture to warm up to 20°. Cold water was added and the organic layer separated. After drying over anhydrous sodium sulfate, the methylene chloride was taken off slowly in vacuo. As the volume of solvent decreased, a neutral crystalline material separated out, and was isolated. The yield was 51.1 g. (88% based on $C_{18}H_{16}POCl$) of the acid chloride. This material was recrystallized from petroleum ether (B.P. 60–68°) and gave a material, M.P. 74–75°. *Analysis.*—Calcd. for $C_8H_{16}POCl$: C, 49.36; H, 8.29; P, 15.92; Cl, 18.22. Found: C, 49.80; H, 8.45; P, 15.90; Cl, 18.20.

*Example XII*

The phosphinic acid chloride from 2,4,4-trimethylpentene-2 prepared as described in Example XI was refluxed with water for 1 hour. A monobasic acid ($C_8H_{16}PO_2H$) was formed, M.P. 75–76° C. *Analysis.*—Calcd. for $C_8H_{16}PO_2H$: C, 54.53; H, 9.73; P, 17.58; neut. equiv., 176.2. Found: C, 54.89; H, 9.72; P, 16.07; neut. equiv., 176.2.

*Example XIII*

The phosphinic acid chloride from 2,4,4-trimethylpentene-2 prepared as described in Example XI was dissolved in methanol and added dropwise with stirring to a solution containing a 10–20% excess of sodium methoxide in methanol at 50–60° over a period of about 45 minutes. The mixture was stirred for 15–30 minutes longer. After cooling to room temperature the product was taken up in ether, the phases separated and the ether solution washed with water until the washings were neutral. After drying, the ether and excess alcohol were removed in vacuo. The yield was nearly quantitative when the acid chloride was purified before use. The ester was a colorless liquid or white solid, M.P. 35–36°; B.P. 78°/0.7 mm. *Analysis.*—Calcd. for $C_8H_{16}PO_2CH_3$: Sap. equiv., 190.2; P, 16.3; mol. wt., 190.2. Found: Sap. equiv., 190.6; P, 17.3; mol. wt. (ebullioscopic in acetone), 201.

*Example XIV*

A three-neck flask, fitted with stirrer reflux condenser and dropping funnel, was charged with 300 ml. methylene chloride, 68.8 g. (0.50 mole) phosphorus trichloride and 66.6 g. (0.50 mole) anhydrous aluminum chloride. The mixture was cooled to 0–10° and 56.0 g. (0.50 mole) of 2,4,4-trimethyl-2-pentene was added over about 20 minutes. The aluminum chloride dissolved as the addition proceeded. After addition was complete, the temperature and stirring were continued for an additional hour. 300 ml. of water was then added dropwise with cooling to keep the temperature below 25°. The organic phase was separated, washed, dried, and stripped in vacuo, leaving 85 g. white solid. On recrystallization from Skellysolve B, there were obtained 60.0 g. (62% of theory) of the acid chloride, M. 72–75°. Concentration of the filtrate yielded 19.0 g. (0.11 mole) of 1,1,2,3,3-pentamethyltrimethylene phosphinic acid. Refluxing the acid chloride with water for 2 hours gives a quantitative yield of the acid as its dihydrate; white shiny platelets, M. 54–58°; calc. for $C_8H_{16}PO_2H \cdot 2H_2O$, N.E. 212; found, N.E. 216. Drying in a vacuum desiccator or heating above its melting point converts the hydrate to the anhydrous acid, M. 72–74°. A solution of 98.0 g. (0.50 mole) of the acid chloride in 150 ml. methanol was added dropwise with stirring to a solution of sodium methoxide made from 18.2 g. (0.55 mole) sodium in 500 ml. methanol. After standing for 20 hours, the methanol was stripped off in vacuo. The solid remaining was taken up in water and this solution was extracted several times with methylene chloride. After drying and removal of the solvent, distillation gave 89.1 g. (94%) of the ester, B. 66–68°/0.2 mm. Saponification of the methyl ester with aqueous base followed by acidification regenerates the acid as its dihydrate. The anhydrous acid is readily converted to the acid chloride by short refluxing with thionyl chloride in benzene.

While in the foregoing specification this invention has been described in relation to certain preferred embodiments thereof and many details have been set forth for purpose of illustration, it will be apparent to those skilled in the art that the invention is susceptible of other embodiments than those specifically set forth herein, and that many of the details described in the foregoing specification can be varied considerably without departing from the basic principles of the invention.

We claim:
1. The process of preparing an organo-phosphorus compound, comprising reacting an olefin compound containing from 2 to 30 carbon atoms in an aliphatic hydrocarbon chain with a phosphorus chloride compound in intimate association with a Friedel-Crafts catalyst, said olefin compound being characterized by containing an olefinic bond in said hydrocarbon chain and by being free of halide groups, said phosphorus chloride compound being represented by the formula

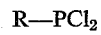
R—PCl₂ wherein R is selected from the class consisting of chloride and aromatic hydrocarbons, whereby a phosphorylation reaction occurs at said olefinic bond to produce a phosphorylated intermediate, and hydrolyzing said intermediate in an aqueous medium to obtain a phosphinic acid.

2. The phosphinic acids produced by the process of claim 1.

3. The process of preparing an organo-phosphorus compound, comprising reacting an olefin compound containing from 2 to 30 carbon atoms in an aliphatic hydrocarbon chain with a phosphorus chloride compound in intimate association with a Friedel-Crafts catalyst, said olefin compound being characterized by containing an olefinic bond in said hydrocarbon chain and by being free of halide groups, said phosphorus chloride compound being represented by the formula

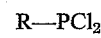
R—PCl₂ wherein R is selected from the class consisting of chloride and aromatic hydrocarbons, whereby a phosphorylation reaction occurs at said olefinic bond to produce a phosphorylated intermediate, hydrolyzing said intermediate in an aqueous medium to obtain a phosphinic acid, and esterifying said phosphinic acid with an esterifying agent selected from the group consisting of alcohols and alkoxides to obtain a phosphinic acid ester.

4. The phosphinic acid esters produced by the process of claim 3.

5. The process of preparing an organo-phosphorus compound, comprising reacting an olefin compound containing from 2 to 30 carbon atoms in an aliphatic hydrocarbon chain with a phosphorus chloride compound in intimate association with a Friedel-Crafts catalyst, said olefin compound being characterized by containing an olefinic bond in said hydrocarbon chain and by being free of halide groups, said phosphorus chloride compound being represented by the formula R—PCl$_2$ wherein R is selected from the class consisting of chloride and aromatic hydrocarbons, whereby a phosphorylation reaction occurs at said olefinic bond to produce a phosphorylated intermediate, and esterifying said intermediate product with an esterifying agent selected from the group consisting of alcohols and alkoxides to obtain a phosphinic acid ester.

6. The process of preparing an organo-phosphorus compound, comprising reacting an olefin compound containing from 4 to 22 carbon atoms in an aliphatic hydrocarbon chain with phosphorus trichloride in intimate association with aluminum chloride, at least about 1 mole of said aluminum chloride being present per mole of said phosphorous trichloride, said reaction being carried out in an organic solvent medium at a temperature of from −15° C. to 50° C., said olefin compound being characterized by containing a single olefinic bond in a nonterminal position in said hydrocarbon chain and by being free of halide groups, thereby obtaining an intermediate product, and hydrolyzing said intermediate in an aqueous medium to obtain a phosphinic acid.

7. The process of preparing an organo-phosphorus compound, comprising reacting an olefin compound containing from 4 to 22 carbon atoms in an aliphatic hydrocarbon chain with phosphorus trichloride in intimate association with aluminum chloride, at least about 1 mole of said aluminum chloride being present per mole of said phosphorous trichloride, said reaction being carried out in an organic solvent medium at a temperature of from −15° C. to 50° C., said olefin compound being characterized by containing a single olefinic bond in a nonterminal position in said hydrocarbon chain and by being free of halide groups, said phosphorus chloride compound being represented by the formula R—PCl$_2$ wherein R is selected from the class consisting of chloride, phenyl, and naphthyl, whereby a phosphorylation reaction occurs at said olefinic bond to produce a phosphorylated intermediate, hydrolyzing said intermediate in an aqueous medium to obtain a phosphinic acid, and esterifying said phosphinic acid with an esterifying agent selected from the group consisting of alcohols and alkoxides to obtain a phosphinic acid ester.

8. The process of preparing an organo-phosphorus compound, comprising reacting an olefin compound containing from 4 to 22 carbon atoms in an aliphatic hydrocarbon chain with phosphorus trichloride in intimate association with aluminum chloride, at least about 1 mole of said aluminum chloride being present per mole of said phosphorous trichloride, said reaction being carried out in an organic solvent medium at a temperature of from −15° C. to 50° C., said olefin compound being characterized by containing a single olefinic bond in a nonterminal position in said hydrocarbon chain and by being free of halide groups, said phosphorus chloride compound being represented by the formula R—PCl$_2$ wherein R is selected from the class consisting of chloride and aromatic hydrocarbons, whereby a phosphorylation reaction occurs at said olefinic bond to produce a phosphorylated intermediate, and esterifying said intermediate product with an esterifying agent selected from the group consisting of alcohols and alkoxides to obtain a phosphinic acid ester.

References Cited by the Examiner
UNITED STATES PATENTS

| | | | |
|---|---|---|---|
| 2,137,792 | 11/1938 | Woodstock | 260—461 |
| 2,659,714 | 11/1953 | Harman et al. | 260—461 |

CHARLES B. PARKER, *Primary Examiner.*

IRVING MARCUS, *Examiner.*